US005460274A

United States Patent [19]
Kramer

[11] Patent Number: 5,460,274
[45] Date of Patent: Oct. 24, 1995

[54] HANGING BIKE RACK

[76] Inventor: Robert L. Kramer, 9770 N. 80th Place, Scottsdale, Ariz. 85258

[21] Appl. No.: 152,529

[22] Filed: Nov. 16, 1993

Related U.S. Application Data

[63] Continuation-in-part of Ser. No. 935,982, Aug. 27, 1992, abandoned.

[51] Int. Cl.$^6$ ........................................ A47F 7/00
[52] U.S. Cl. .............................. 211/17; 211/19; 248/322; 248/339
[58] Field of Search ..................... 211/113, 87, 18, 211/19, 20, 17; 248/322, 339, 692; D12/115

[56] References Cited

U.S. PATENT DOCUMENTS

| | | | |
|---|---|---|---|
| 557,567 | 4/1896 | Eddy | 211/17 |
| 580,032 | 4/1897 | Bierbach | 211/18 |
| 588,542 | 8/1897 | Williams | 211/17 |
| 595,967 | 12/1897 | Parsons | 211/18 |
| 602,270 | 4/1898 | Sackett | 211/18 |
| 607,024 | 7/1898 | Durfee et al. | 211/18 |
| 614,503 | 11/1898 | Sackett | 211/18 |
| 2,502,815 | 4/1950 | Beebe | 211/113 X |
| 3,782,559 | 1/1974 | Wright | 211/113 |
| 3,872,972 | 3/1975 | Cummins et al. | 211/17 |
| 3,924,751 | 12/1975 | Ballenger | 211/17 |
| 4,343,404 | 8/1982 | Folsom | 211/17 |
| 4,700,845 | 10/1987 | Fretter | 211/18 |
| 4,821,890 | 4/1989 | Hills | 211/18 |
| 4,840,278 | 6/1989 | Gelinas | 211/18 |
| 5,183,162 | 2/1993 | Ritzenthaler | 211/18 X |
| 5,354,035 | 10/1994 | Helgren | 211/18 X |

FOREIGN PATENT DOCUMENTS

| | | | |
|---|---|---|---|
| 26487 | of 1898 | United Kingdom | 211/18 |
| 16995 | of 1898 | United Kingdom | 211/18 |
| 7097 | of 1906 | United Kingdom | 211/18 |

Primary Examiner—Ramon O. Ramirez
Assistant Examiner—Korie Chan
Attorney, Agent, or Firm—Jordan M. Meschkow; Lowell W. Gresham

[57] ABSTRACT

A three point suspension system for storing a bicycle in a horizontal position, including three support members depending from a ceiling in a triangular pattern.

13 Claims, 3 Drawing Sheets

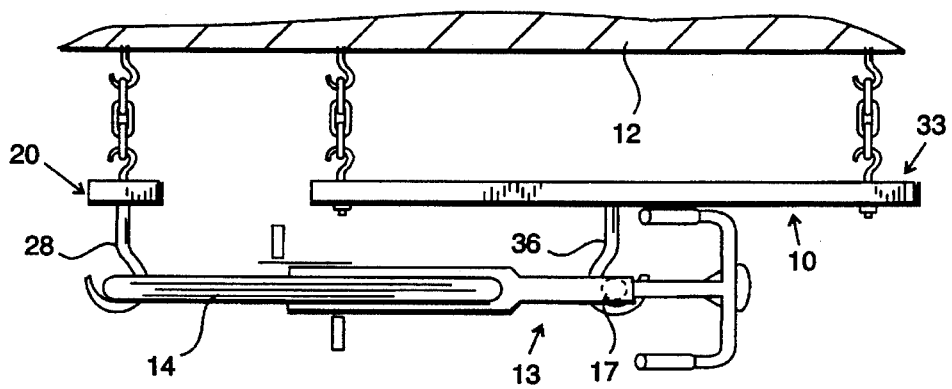
Fig. 5
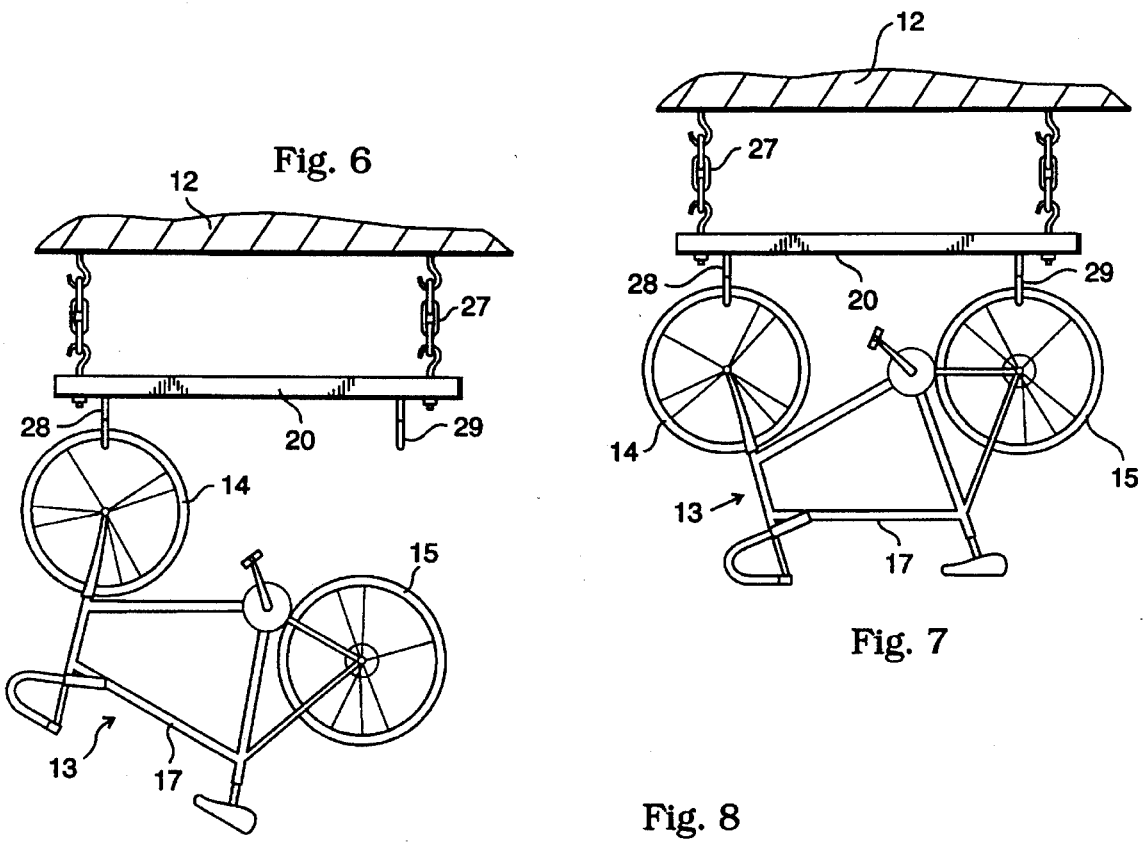
Fig. 6
Fig. 7
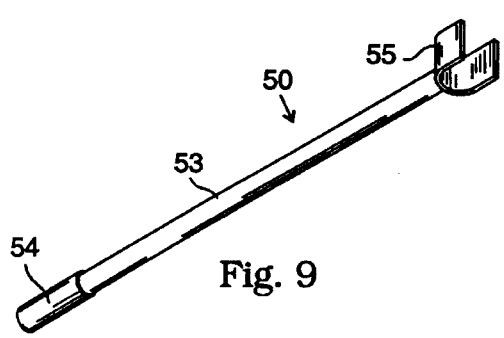
Fig. 9
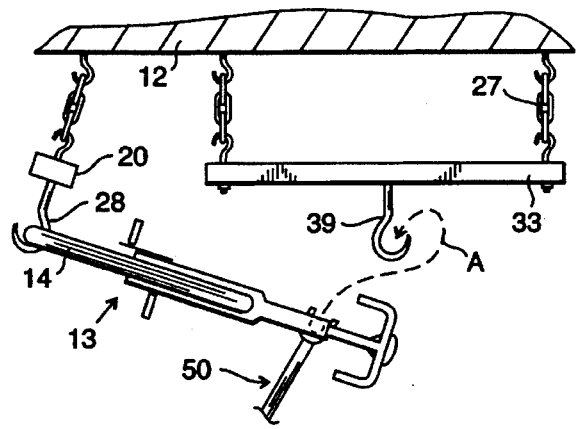
Fig. 8

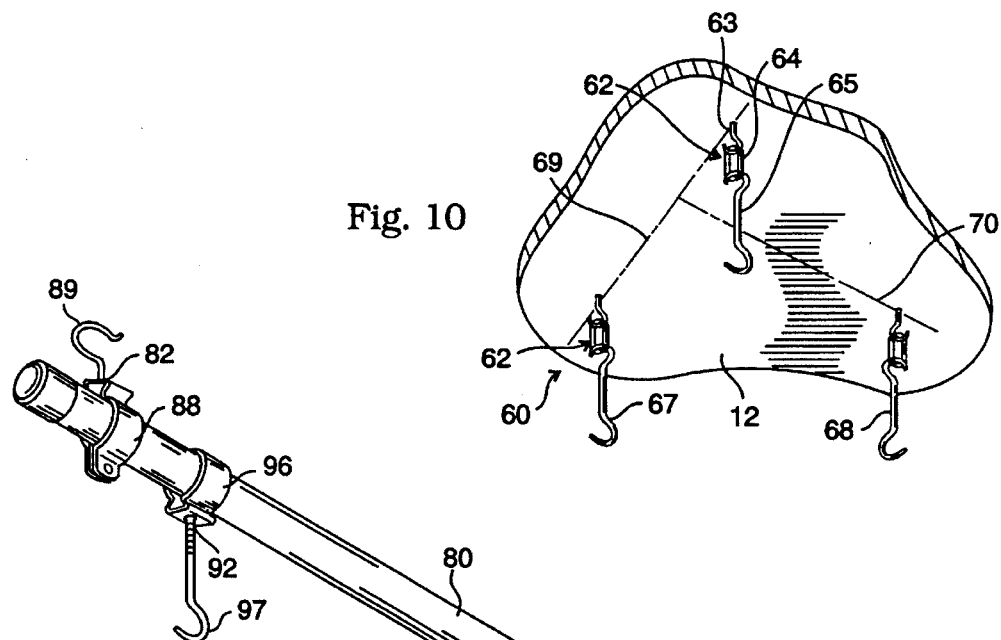
Fig. 10
Fig. 11
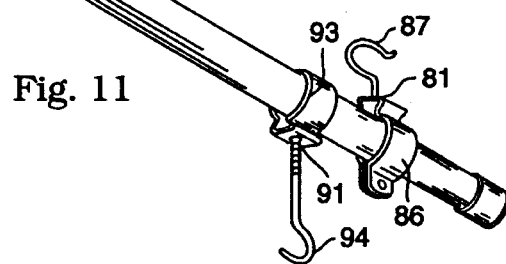
Fig. 12
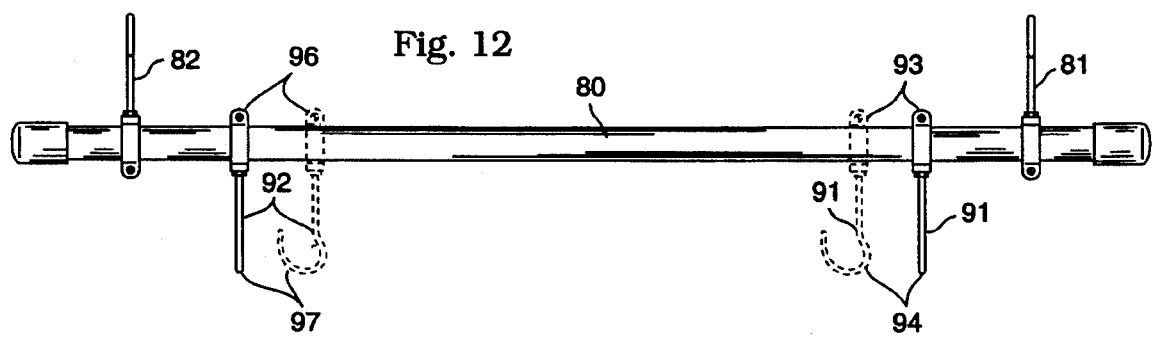
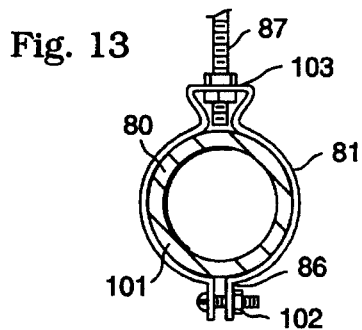
Fig. 13
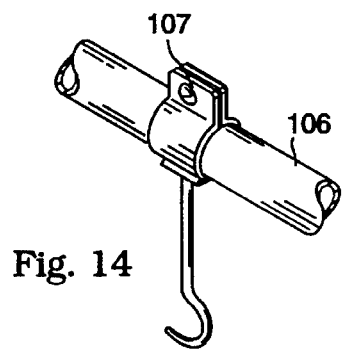
Fig. 14

HANGING BIKE RACK

This application is a continuation-in-part of application Ser. No. 07/935,982, filed Aug. 27, 1992, which is now abandoned.

BACKGROUND OF THE INVENTION

1. Field of the Invention

This invention relates to storage devices.

More particularly, the present invention relates to an apparatus for storing a bicycle.

In a further and more specific aspect, the present invention is directed to an apparatus for suspending a bicycle from a ceiling.

2. Prior Art

Bicycles are commonly used by a great number of people, for transportation or just recreation. In either case, the bicycle must be stored when not in use. Traditionally, a garage or a storage shed is the most convenient location. While most bicycles are supplied with an extendable stand, which allows them to be propped in an upright position, a bicycle stored in this manner takes up a great deal of room. In most garages or storage sheds, extra room is not a commodity in great abundance. Therefore, devices have been developed in an attempt to reduce the amount of space needed for storing a bicycle.

Conventionally, bicycle storage devices are hooks which may be secured to a ceiling or a wall and which are designed to suspend the bicycle from one of its wheels. Also known are hangers or racks which are secured to a wall and engage various portions of a bicycle in order to suspend it.

Bicycles stored in this manner have the benefit of being held securely. This substantially eliminates the possibility of the bicycle being tipped over and damaged. It also reduces the amount of space necessary for storing a bicycle. However, bicycles stored in this manner still take up a substantial amount of storage space. Even when hung from the ceiling, the bicycle hangs vertically downward interfering with the space located directly below. Unless the ceiling is very high, very few objects could be stored in the space under the hanging bicycle, and if used in a garage, it would have to be hung from the corner or side of the garage to allow access for an automobile.

It would be highly advantageous, therefore, to remedy the foregoing and other deficiencies inherent in the prior art.

Accordingly, it is an object of the present invention to provide a new and improved bicycle storing device.

Another object of the present invention is to provide a device which will store a bicycle above ground level.

And another object of the present invention is to provide a bicycle storage rack which may be readily adjusted to mount bicycles of differing sizes.

Still another object of the present invention is to provide a device which stores a bicycle in a horizontal position.

Yet another object of the present invention is to provide a device which stores a bicycle by suspending it from a ceiling.

Yet still another object of the present invention is to provide a bicycle storage rack which is easy to use and install.

A further object of the present invention is to provide a bicycle storage rack which suspends a bicycle from the ceiling, while allowing the space underneath to be used for storage.

And a further object of the present invention is to provide a bicycle storage rack which stores the bicycle out of the way while still being easily assessable.

SUMMARY OF THE INVENTION

Briefly, to achieve the desired objects of the instant invention in accordance with a preferred embodiment thereof, provided are three support members depending downward from a ceiling by short lengths of supple material in a triangular configuration. A bicycle is stored by mounting one of the bicycles wheels to one of the support members, and mounting the other wheel to another support member. Finally, the bicycle is placed in the horizontal position by hooking the cross bar on a man's bicycle to the final support member or the seat tube just below the seat on a woman's bicycle.

In accordance with a more specific embodiment, a suspension bar is mounted by two chains to the garage ceiling, and has two support members depending therefrom in a spaced apart relationship. A second suspension bar depends from the ceiling perpendicular to the first suspension bar and has a single support member depending therefrom.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which:

FIG. 5 is a side view of the bicycle rack storing a bicycle;

FIGS 6—8 illustrate the steps of placing a bicycle in storage using the horizontal bicycle storage rack illustrated in FIG. 1;

FIG. 9 is a perspective view illustrating the tool used to position a bicycle on the horizontal bicycle storage rack;

FIG. 10 illustrates an alternate embodiment of the horizontal bicycle storage rack;

FIG. 11 is a perspective view of an alternate embodiment of a two point suspension bar of the horizontal bicycle storage rack;

FIG. 12 is a side view of the two point suspension bar as shown in FIG. 11;

FIG. 13 is a cross-sectional view of the two point suspension bar as shown in FIG. 11; and FIG. 14 is a perspective view of an alternate embodiment of a support member.

DETAILED DESCRIPTION OF THE PREFERRED EMBODIMENT

Figure 1:
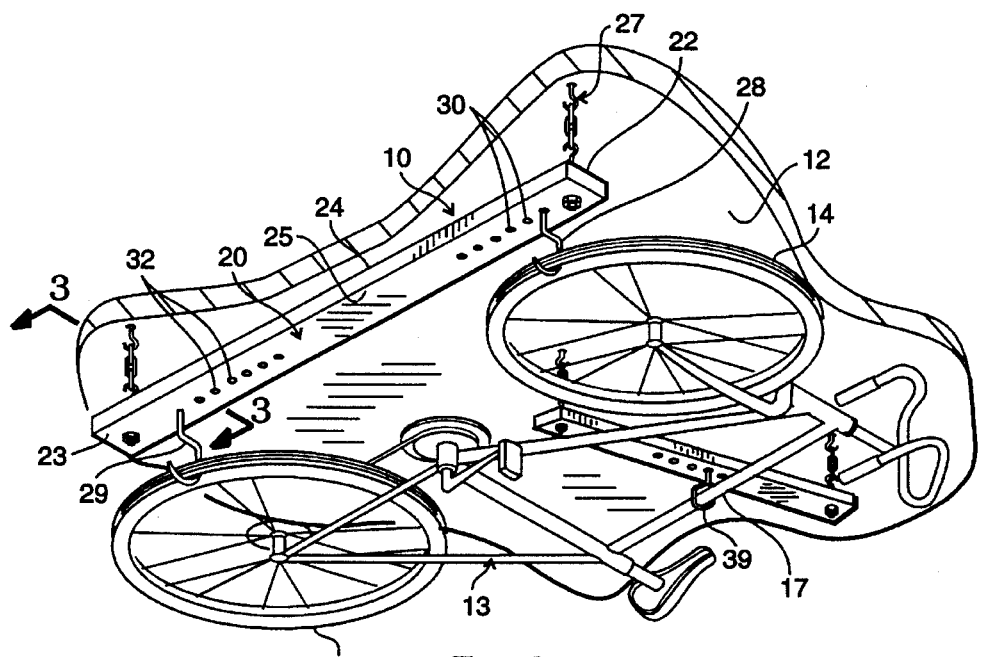
FIG. 1 is a perspective view of a horizontal bicycle rack, constructed in accordance with the teachings of the instant invention, as it would appear being used to store a bicycle.

Turning now to the drawings in which like reference characters indicate corresponding elements throughout the several views, attention is first directed to FIG. 1 which illustrates a horizontal bicycle storage rack generally designated 10. Horizontal bicycle storage rack 10 is fastened to a ceiling 12 of a storage building such as a garage or storage shed, and supports a bicycle 13 in a horizontal position. The horizontal position is achieved by a three point support or suspension system removably coupled to front wheel 14, rear wheel 15, and cross bar 17 of bicycle 13. It will be understood by those skilled in the art that while cross bar 17 is used as the third suspension point in a man's style bicycle, the seat tube just below the seat would act as the third suspension point on a woman's style bicycle.

Figure 2:
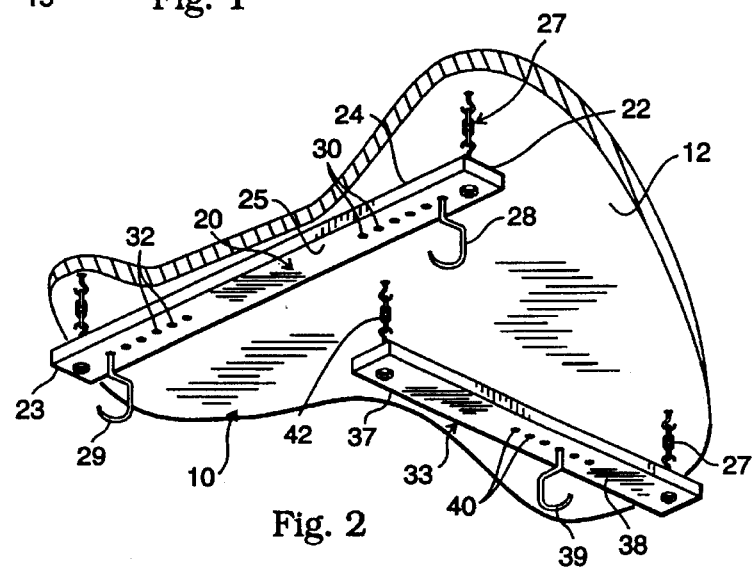
FIG. 2 is a perspective view of a horizontal bike rack as it would appear installed on a ceiling.
Figure 4:
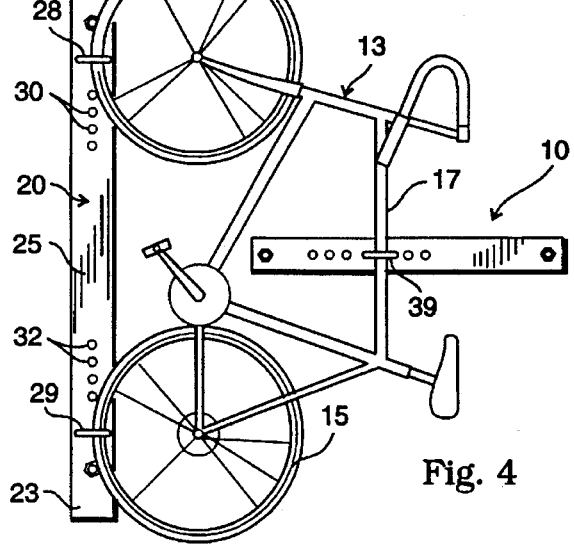
FIG. 4 is an upward looking view of the bicycle rack storing a bicycle as shown in FIG. 1.

Horizontal bicycle storage rack 10 includes a three point support system as can be seen in FIG. 2. A two point suspension or support bar 20 having a first end 22, a second end 23, a top surface 24 facing towards ceiling 12 and a bottom surface 25 facing away from ceiling 12, is coupled to ceiling 12 in a spaced apart horizontal relationship therewith, depending from attachment members 27. Attachment members 27 are coupled to top surface 24 proximate first end 22 and second end 23. Support members 28 and 29 are adjustably coupled to bottom surface 25 of two point suspension bar 20. A series of bores 30 formed in bottom surface 25 of two point suspension bar 20 extend longitudinally inward from first end 22. A complemental series of bores 32 formed in bottom surface 25 extend longitudinally inward from second end 23. Support members 28 and 29 are received by bores 30 and 32 respectively, to allow the distance between support members 28 and 29 to be varied. In this embodiment, support members 28 and 29 are J-shaped hooks receivable in bores 30 and 32 respectively.

Still referring to FIG. 2, a one point suspension or support bar 33 having a first end 34, second end 35 a top surface 37 facing toward ceiling 12 and a bottom surface 38 facing away from ceiling 12, is coupled in a spaced apart horizontal relationship to ceiling 12, depending from attachment members 27. Attachment members 27 are coupled to top surface 37 proximate first end 34 and second end 35. One point suspension bar 33 is coupled to ceiling 12 coplanar with two point suspension bar 20 spaced apart from and perpendicular to a point intermediate first end 22 and second end 23 of two point suspension 20. A single support member 39 is adjustably coupled to bottom surface 38 of one point suspension bar 33. In this preferred embodiment, support member 39 is a J-shape hook having a threaded end. A series of threaded bores 40 are formed in bottom surface 38 intermediate first end 34 and second end 35. Support member 39 is threadibly received by one of bores 40, allowing adjustment of the distance between support member 39 and two point suspension bar 20.

Figure 3:
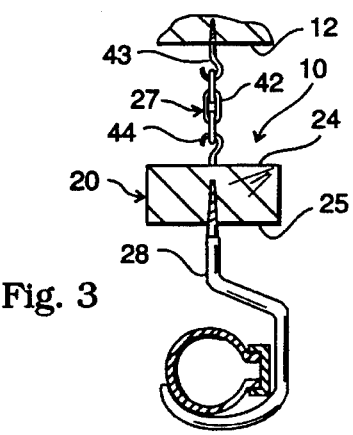
FIG. 3 is a cross-sectional view taken along line 3—3 of FIG. 1.

Attachment members 27 allow movements of two point suspension bar 20 and one point suspension bar 33 with respect to ceiling 12. This is accomplished by using a supple member such as a short length chain 42. With further reference to FIG. 3, which illustrates two point suspension bar 20 coupled to ceiling 12, attachment members 27 consist of a J-shaped hook 43 have a threaded end securely threaded into ceiling 12. A bar hook 44 extends through top surface 24 of two point suspension bar 20 proximate first end 22 and second end 23. Hooks 43 and 44 are moveably coupled by chain 42. It will be understood by those skilled in the art that FIG. 3 illustrates attachment members 27 of two point suspension bar 20 for purposes of reference alone, and that attachment members 27 are identical on one point suspension bar 33.

Referring now to FIG. 5, it can be seen that bicycle 13 is supported by a horizontal bicycle storage rack 10 in a horizontal position proximate ceiling 12. Support members 28 and 29 of two point suspension bar 20 support front wheel 14 and rear wheel 15 respectively of bicycle 13. Support member of one point suspension bar 33 supports cross bar 17 of bicycle 13. Various sized bicycles may be stored by horizontal bicycle rack 10 without the need to change the positions of two point suspension bar 20 and one point suspension bar 33 with respect to each other, since support members 28, 29 and 39 can be adjusted in bores 30, 32 and 40 respectively.

Preferably, conventional wooden 2×4's are used for two point suspension bar 20 and one point suspension bar 33. Bores 30, 42, and 40 can be formed by conventional drilling. While conventional 2×4's are illustrated, it will be understood by one skilled in the art, that any elongate member could be used as a suspension bar. Exemplary are punched angle metal which could be easily suspended as discussed above for 2×4's, and contains sufficient bores to accommodate and allow adjustment of support members.

The storing of bicycle 13 is illustrated in FIGS. 6–8. With reference to FIG. 6, front wheel 14 is mounted on support member 28. Rear wheel 15 is then mounted on support member 29 as illustrated in FIG. 7. At this point, bicycle 13 is supported upside down above ground level by two point suspension bar 20. To complete the storage of bicycle 13, a storage tool 50 is used to pivot bicycle 13 at the two point suspension of front wheel 14 and rear wheel 15, until cross bar 17 can be placed in support member 39 of one point suspension bar 33. As can be seen in FIG. 8, the movement of two point suspension bar 20 away from then towards one point suspension bar 33 allows for easy positioning of cross bar 17 in support member 39 along a path illustrated by arrow A.

Storage tool 50 is illustrated in FIG. 9 and consist of a shaft 53 having a grip 54 attached to one end and a U-shaped member 55 coupled to the opposing end. Storage tool 50 is used as illustrated in FIG. 8, by placing U-shaped member 55 into contact with cross bar 17. The user grips grip 50, and forces bicycle 13 to pivot upwards into a horizontal position where cross bar 17 can be mounted on support member 39. This step could be accomplished by hand, however, storage tool 50 extends the users reach to allow for simplified storage of bicycle 13.

Referring now to FIG. 10, an alternate embodiment of the present invention generally designated 60 is illustrated. In this embodiment, horizontal bike rack 60 consist of a three point suspension system coupled to ceiling 12 by attachment members 62. In this embodiment, attachment members 62 are substantially similar to attachment members 27 of horizontal bicycle rack 10, consisting of a hook 63 having a threaded end securely threaded into ceiling 12, and a chain segment 64 depending downward therefrom. However, in this embodiment, the three point support system consist of a support member 65 coupled to chain 64. Three support members 65 are used in a triangular pattern and operates substantially identical to horizontal bicycle rack 10. Support members 65 and 67 are positioned along a reference line 69 and support member 68 is spaced apart from and positioned along a reference line 70 intermediate support members 65 and 67. However, this embodiment is non-adjustable, allowing only similar size bicycles to be stored. In order to store a different size bicycle, attachment members 62 must be removed and repositioned to accommodate the dimensions of the new bicycle.

An alternate embodiment of a two point suspension bar 80 of the present invention is illustrated in FIGS. 11 and 12. In this embodiment two point suspension bar 80 is designed to be coupled to ceiling 12 (see FIG. 2) by attachment members 81 and 82. As illustrated in FIG. 11, attachment members 81 and 82 are substantially similar to hooks 44 of attachment members 27 of horizontal bicycle rack 10, as illustrated in FIG. 2. However, in this embodiment, attachment member 81 includes a clamp end 86 and a hook end 87. Attachment member 82 includes a clamp end 88 and a hook end 89. Clamp ends 86 and 88 of attachment members 81 and 82 are slidably engaged on two point suspension bar 80 for infinite adjustability. Hook ends 87 and 89 are constructed to engage chains 42 of attachment members 27.

In this embodiment, front wheel 14 and rear wheel 15 of bicycle 13 (see FIG. 1) are suspended from two point suspension bar 80 by support members 91 and 92. Support member 91 includes a clamp end 93 and a hook end 94 and support member 92 includes a clamp end 96 and a hook end 97. Support members 91 and 92 are slidably engaged on two point suspension bar 80 by clamp ends 93 and 96 for infinite adjustability. The wheels 14 and 15 of bicycle 13 are supported by hook ends 94 and 97 of support members 91 and 92. Support members 91 and 92 are illustrated in FIG. 12 in several positions.

Preferably, in this embodiment, a conventional fiberglass pole is used for two point suspension bar 80. While a conventional fiberglass pole is illustrated, it will be understood by one skilled in the art, that any elongated member could be used as a suspension bar. Exemplary is metal piping which could be easily suspended as discussed above for a fiberglass pole. Also, it will be understood by those skilled in the art that FIGS. 13 illustrates attachment member 81 for purposes of reference alone, and that attachment members 81 and 82 and support members 91 and 92 are identical. Attachment members 81 and 82 and support members 91 and 92 may be used interchangeably. Attachment member 81 includes a clamp end 86 and a hook end 87. Clamp end 86 consists of a split ring 101 with an adjustable screw 102 in the split. Hook end 87 is held in the opposite side of ring 101 by a nut 103.

It will be understood that one point suspension bar 33 can be replaced by a one point suspension bar 106, similar to two point suspension bar 80 but shorter. One point suspension bar 106 is suspended from ceiling 12 by two attachment members similar to attachment members 81 and 82. A single support member 107, similar to support member 91, is slidably engaged on one point suspension bar 106, as illustrated in FIG. 14. It should further be understood that either or both two point suspension bar 80 and one point suspension bar 106 can be substituted for either or both two point suspension bar 20 and one point suspension bar 33.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A bicycle storing rack for storing, horizontally from a ceiling, a bicycle having a front wheel, a rear wheel, and a third support point, said rack comprising:

a three point suspension system with first and second support members adapted to engage the front and the rear wheels and a third support member adapted to engage the third support point a two point, support bar adjustably supporting two of said three support members along said two point support bar and a one point support bar adjustably supporting said third support member along said one point support bar;

supple attachment members adapted for coupling said suspension system to said ceiling; and said three support members depend downward from said respective support bars in a triangular pattern.

2. A bicycle storing rack as claimed in claim 1 wherein said two point support bar further includes:

an elongate member having a first end and a second end;

a first series of bores are formed in said elongate member extending longitudinally inward from said first end; and a second series of bores are formed in said elongate member extending longitudinally inward from said second end.

3. A bicycle storing rack as claimed in claim 1 wherein said one point support bar further includes:

an elongate member having a first end and a second end; and a series of bores are formed in said elongate member extending longitudinally inward from said first end.

4. A bicycle storing rack as claimed in claim 3 wherein said one point support bar depends from said ceiling in a perpendicular spaced apart relationship, coplanar with said two point support bar.

5. A bicycle storing rack as claimed in claim 1 wherein said two point support bar further includes an elongated member to which said two support members are slidably engaged for infinite adjustability.

6. A bicycle storing rack as claimed in claim 5 wherein said one point support bar includes an elongated member to which said support member is slidably engaged for infinite adjustability.

7. A bicycle storing rack for storing a bicycle horizontally from a ceiling, said rack comprising:

a three point suspension system including three support members depending downward in a triangular pattern where two of said three support members adjustably depend from a two point support bar, said two point support bar including an elongate member having a first end and a second end where a first series of bores are formed in said elongate member extending longitudinally inward from said first end and a second series of bores are formed in said elongate member extending longitudinally inward from said second end, and where said third support member adjustably depends from a one point support bar; and supple attachment members coupling said suspension system to said ceiling.

8. A bicycle storing rack as claimed in claim 7 wherein said one point support bar further includes:

an elongate member having a first end and a second end; and a series of bores are formed in said elongate member extending longitudinally inward from said first end.

9. A bicycle storing rack as claimed in claim 8 wherein said one point support bar depends from said ceiling in a perpendicular spaced apart relationship, coplanar with said two point support bar.

10. A bicycle storing rack for storing a bicycle horizontally from a ceiling, said rack comprising:

a first support member and a second support member coplanar with said first support member adapted for, moveably depending from said ceiling;

said first support member and said second support member being variably positioned relative to each other along a first horizontal reference line further being adjustably coupled to a first elongate member which extends along said first horizontal reference line;

a third support member coplanar with said first support member and said second support member, moveably adapted for depending from said ceiling at a point intermediate said first support member and said second support member;

said third support member spaced apart from said first horizontal reference line and variably positioned along a second horizontal reference line perpendicular to said first horizontal reference line, and wherein said third support member is adjustably coupled to a second elongate member which extends along said second horizontal reference line; and further comprising supple attachment members coupling said elongate members to said ceiling.

11. A bicycle storing rack as claimed in claim 10 wherein said second horizontal reference line is perpendicular to said first horizontal reference line and intersects said first horizontal reference line intermediate said first and second support members.

12. A bicycle storing rack for storing a bicycle horizontally from a ceiling, said rack comprising:

a two point support bar;

a one point support bar;

a three point suspension system including three support members depending downward in a triangular pattern where two of said three support members adjustably depend from said two point support bar, said two point support bar including an elongated member to which said two support members are slidably engaged for infinite adjustability along said two point support bar, and where said third support member adjustably depends from said one point support bar; and supple attachment members adapted for coupling said suspension system to said ceiling.

13. A bicycle storing rack as claimed in claim 12 wherein said one point support bar depends from said ceiling in a perpendicular spaced apart relationship, coplanar with said two point support bar.

* * * * *

UNITED STATES PATENT AND TRADEMARK OFFICE
CERTIFICATE OF CORRECTION

PATENT NO. : 5,460,274
DATED : October 24, 1995
INVENTOR(S) : Robert L. Kramer

It is certified that error appears in the above-indentified patent and that said Letters Patent is hereby corrected as shown below:

In Claim 1, column 5 line 66 that portion of the claim reading

"third support point a two point, support bar"

should read:

--third support point, a two point support bar"

Signed and Sealed this

Thirtieth Day of January, 1996

Attest:

BRUCE LEHMAN

Attesting Officer

Commissioner of Patents and Trademarks